US012652108B2

(12) United States Patent
Chen

(10) Patent No.: US 12,652,108 B2
(45) Date of Patent: Jun. 9, 2026

(54) SYSTEM AND METHOD FOR DUAL USE INTEGRATED PHOTONIC CIRCUIT

(71) Applicant: Cisco Technology, Inc., San Jose, CA (US)

(72) Inventor: Long Chen, Maynard, MA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 18/377,209

(22) Filed: Oct. 5, 2023

(65) Prior Publication Data

US 2025/0219736 A1      Jul. 3, 2025

(51) Int. Cl.
H04B 10/50 (2013.01)
G02B 6/12 (2006.01)
G02F 1/21 (2006.01)
H04B 10/516 (2013.01)

(52) U.S. Cl.
CPC ....... H04B 10/505 (2013.01); G02B 6/12007 (2013.01); G02F 1/212 (2021.01); H04B 10/516 (2013.01); G02B 2006/12142 (2013.01)

(58) Field of Classification Search
CPC ................ H04B 10/505; H04B 10/516; G02B 6/12007; G02F 1/212
USPC ......................................................... 398/188
See application file for complete search history.

(56) References Cited

U.S. PATENT DOCUMENTS

| | | | | |
|---|---|---|---|---|
| 11,336,376 B1 * | 5/2022 | Xie | ....................... | H04B 10/572 |
| 12,253,716 B1 * | 3/2025 | Chen | ....................... | G02B 6/125 |
| 2015/0155945 A1 * | 6/2015 | Urino | .................... | H04B 10/032 |
| | | | | 398/183 |
| 2015/0198859 A1 * | 7/2015 | Chen | ................... | H04B 10/5053 |
| | | | | 385/3 |
| 2020/0033228 A1 * | 1/2020 | Piazza | .............. | G01R 31/31728 |
| 2022/0286208 A1 * | 9/2022 | Wang | ................. | H04B 10/5051 |

FOREIGN PATENT DOCUMENTS

| | | | | |
|---|---|---|---|---|
| CN | 104541461 B | * | 7/2017 | ............. H04B 10/50 |
| WO | WO-2005081431 A1 | * | 9/2005 | ....... H04B 10/25751 |

OTHER PUBLICATIONS

Extended European Search Report for European Application No. 24204771.0, date of completion of search Feb. 12, 2025, (11 pages).

* cited by examiner

*Primary Examiner* — Amritbir K Sandhu
(74) *Attorney, Agent, or Firm* — Patterson + Sheridan, LLP

(57) ABSTRACT

In one embodiment, the disclosure relates to a multi-use electro-optical device. The device may include a first group of optical inputs that include one or more optical inputs that are user selectable for a first operating mode. The device may also include a second group of optical inputs that include four or more optical inputs, wherein the four or more optical inputs are user selectable for a second operating mode. The device may include a first optical output operable to support the second operating mode. The first optical output is in optical communication with the four or more optical inputs. The device may also include a second group of optical outputs that includes four or more optical outputs, wherein the four or more optical outputs are user selectable for a first operating mode. The device also may include a modulator stage that includes four or more modulators.

20 Claims, 2 Drawing Sheets

SYSTEM AND METHOD FOR DUAL USE INTEGRATED PHOTONIC CIRCUIT

FIELD

This disclosure relates generally to the field of photonic integrated circuits.

BACKGROUND

Contemporary optical communications and other photonic systems make extensive use of photonic integrated circuits (PIC) that are advantageously mass-produced in various configurations for various purposes. Increasing economic and data throughput pressures make it advantageous to provide a PIC with reduced inventory cost, reduced development cost, and the capability of meeting performance requirements for multiple applications.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DESCRIPTION OF EXAMPLE EMBODIMENTS

Overview

Figure 1:
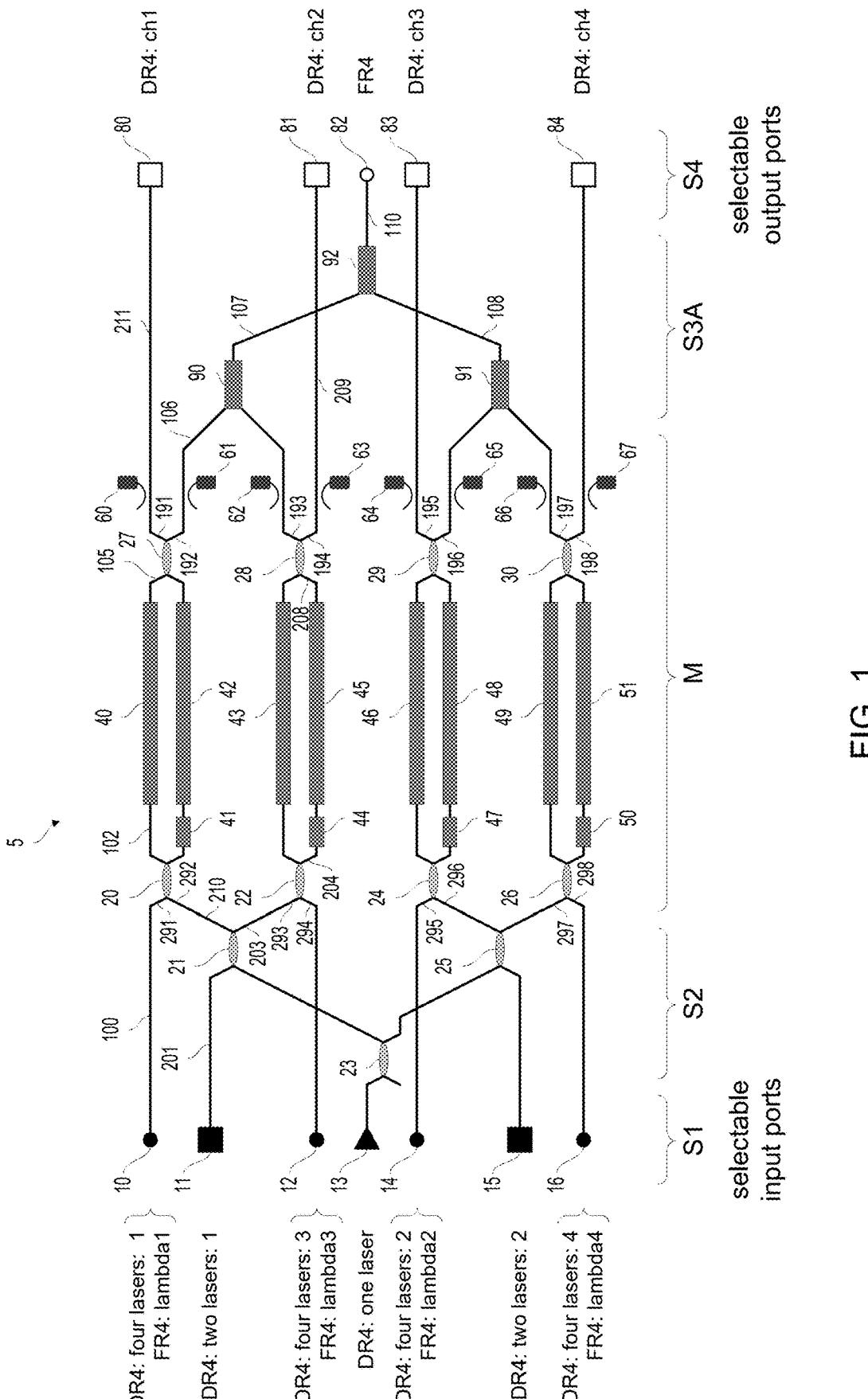
FIG. 1 is a schematic illustration of a dual-use/multi-use electro optical device with selectable optical inputs and optical output providing both DR4 capability and a two stage multiplexing arrangement for FR4 according to an exemplary embodiment of the disclosure.

In part, in one aspect, the disclosure relates to a multi-use electro-optical device. The device may include a first group of optical inputs that include one or more optical inputs. The one or more optical inputs are user selectable for a first operating mode. The device may also include a second group of optical inputs that include four or more optical inputs, wherein the four or more optical inputs are user selectable for a second operating mode. The device may include a first optical output, wherein the first optical output operable to support the second operating mode. The first optical output is in optical communication with the four or more optical inputs. The device may also include a second group of optical outputs that includes four or more optical outputs, wherein the four or more optical outputs are user selectable for a first operating mode. The device also may include a modulator stage that includes four or more modulators, each modulator may include two optical modulator inputs and two optical modulator outputs such that the modulator stage has two sets of optical modulator inputs and of optical modulator outputs. In some embodiments, there may be two sets of optical modulator inputs and two set of optical modulator outputs.

In one embodiment, the multi-use electro-optical device may include a first optical circuit operable to connect the first group of optical inputs to a first set of optical inputs of four or more modulators of the two sets of optical modulator inputs, and operable to connect the second group of optical inputs to the second set of optical inputs of the four or more modulators of the two sets of optical modulator inputs. The device may also include a second optical circuit operable to connect a first set of optical outputs of the four or more modulators of the two sets of optical modulator outputs to the second group of optical outputs, for the first operating mode. In some embodiments, the device includes an output multiplexer connecting a second set of optical outputs of the four or more modulators of the two sets of optical modulator outputs to the first optical output, for the second operating mode.

EXAMPLE EMBODIMENTS

Optical data transmission and signal conditioning technology is critical to meeting the increasing throughput demands of the current worldwide data networks. Due to certain optical and electro-optical constraints, the optical data transmission is separated into different specifications and operating regimes. Importantly, the regulated definitions of these specifications and regimes often change with each new throughput target and this increases costs for technology development and inventory maintenance. Various types of devices such as different devices and components may be classified or identified by various specifications that in turn provide details relating to the number of channels.

For example, DR4 and FR4 are optical interface specifications that cover different regimes of an optical network and may be used to categories different devices and device configurations that substantially relate to the specification. In various embodiments, a DR4 device provides four parallel fibers, each fiber providing a single data channel. In some embodiments, one wavelength carries all data channels; in other embodiments, each data channel is carried by a different wavelength. In many embodiments, an FR4 device provides one fiber, wherein the fiber provides four data channels, and wherein each of the four data channels is carried by a different wavelength. In some embodiments, a DR4 device provides four channels over eight fibers running up to about 500 meters in length. In some embodiments, a FR4 device provides one channel such as single fiber carrying four base wavelengths up to about two kilometers.

Current hardware solutions provide dedicated modules for DR4 and FR4 transmitters or operating modes, each module providing its own dedicated photonic integrated circuit (PIC) or other platform. For example, in some embodiments, a DR4 or an FR4 transmitter is implemented with continuous wave (CW) lasers and external electro-optical modulators. In many embodiments, both a DR4 transmitter and an FR4 transmitter comprise four parallel modulators. A DR4 transmitter may use one high-power CW laser to split light evenly among the four modulators, producing four modulated signals. In many embodiments, in a DR4 transmitter, the four modulated signals are guided into four parallel fibers. In some embodiments, if an output power of a CW laser is not high enough to support a 1×4 splitting, a DR4 transmitter may use two CW lasers to feed the four modulator channels.

In other embodiments, a DR4 transmitter may use four CW lasers to support a 1×4 splitting. In various embodiments, an FR4 transmitter may use four CW lasers, each laser coupled to one of the four modulators, each laser having a different wavelength, and wherein separations of laser wavelengths are standardized. In some embodiments, an FR4 transmitter may multiplex the four modulated signals produced by the four modulators to a single waveguide and then couple a multiplexed signal to a single fiber. In some embodiments, a group or a set of modulators such as four or more modulators may form or define a modulator stage of the electro-optical device. In some embodiments, the electro-optical devices disclosed herein are user selectable such that a user may make use of different inputs, outputs, and/or components of the device such that device supports or operates in a first operating mode or a second operating mode. In some embodiments, the first operating mode is DR4 using a first laser. In various embodiments, the first operating mode is DR4 using a first laser and a second laser. In some embodiments, the second operating mode is FR4, wherein each optical input of the four or more optical inputs is operable to receive an input wavelength that is selected from a first wavelength, a second wavelength, a third wavelength, and a fourth wavelength.

As a result, manufacturers tasked with producing optical interface modules necessarily maintain PIC inventories for both FR4 and DR4. In addition, each dedicated PIC must be separately qualified in each hardware application. Reducing both inventory cost and hardware development cost would have a significant positive impact on the industry.

Therefore, one motivation of the present disclosure is to provide a dual-use device such as a transceiver that may implement both FR4 and DR4 features. In part, the disclosure relates to embodiments of a transmitter PIC design that supports both DR4 and FR4 applications. In practice, a module solution provider would maintain inventory of the disclosed dual-use PIC and choose FR4 or DR4 inputs and outputs at the time of manufacture. Additionally, in various embodiments, a given electro-optical device might provide a variety of signal conditioning and/or multiplexing components such as modulators, beam splitters, switches, couplers, gratings, polarizers and other features as disclosed herein. In some embodiments, the splitters are optical couplers, such as for example, 50:50 optical coupler. Various input splitters may be used in many embodiments and enumerated as a first splitter, a second splitter, a third splitter, etc.

In part, the disclosure relates to an electro-optical device such as a PIC-based or other device having multiple inputs and multiple outputs and various groups/stages of components disposed between and defining various optical paths for routing, splitting, multiplexing, modulating, and otherwise operating upon input light signals. A given PIC may include a substrate that may include one or more layers and operable components disposed or formed therein or thereon. In some embodiments, a given electro-optical device is designed to be operable to change between multiple roles, such as a first role or operating mode and a second role or operating mode that incorporates selective inputs and outputs. A user can select what components to connect to the device and thus specify its operating mode.

In some embodiments, the first operating mode and the second operating mode or role may each be selected from DR4 and FR4 in some embodiments. In various embodiments, one device supports the capabilities of a DR4 operating mode and an FR4 operating mode. Thus, in part, the disclosure relates to a 2-in-1 (dual-use) or an N-in-1 (multi-use) device suitable for different use cases based on customer needs. In some embodiments, N may correspond to the number of use cases or operating modes for the electro-optical device. For example, in many embodiments a given multi-use or dual-use electro-optical device may support various telecommunications applications and operating modes by selecting proper input ports (optical inputs) and output ports (optical outputs) for optical coupling. The various applications and operating modes that may be implemented with some exemplary devices may include FR4, DR4 with four CW lasers, DR4 with two CW lasers, and DR4 with a single CW laser.

Refer now to the example embodiment of FIG. 1. FIG. 1 is a schematic illustration of a dual-use or multi-function/multi-use electro-optical device 5 suitable for operating in a DR4 mode or alternatively in an FR4 mode or other operating modes as suitable for a particular application. The electro-optical devices have various components that may be grouped in various ways to help illustrate the device's various selectable operating modes. The left side of the Figure shows various groups or a stage of selectable input ports/optical inputs S1. Some optical inputs having a square symbol are associated with a DR4 operating mode with two lasers. Some optical inputs 10, 12, 14, 16 having a circle symbol correspond to a DR4 operating mode with four lasers. These optical inputs 10, 12, 14, 16 may also correspond to an FR4 operating mode that can receive a first signal with a first wavelength (lambda 1), a second signal with a second wavelength (lambda 2), a third signal with a third wavelength (lambda 3), and a fourth signal with a fourth wavelength (lambda 4). Another optical input 13 having a triangle symbol corresponds to a DR4 operating mode with one laser. The various optical inputs 10, 12, 13, 14, 15, and 16 may be in optical communication with various three-port, four-port, and m-port devices, wherein m is an integer greater than 4, through various optical waveguides as shown in FIG. 1 and as discussed below. In some embodiments, a single laser does not have strong enough optical power to support four channels and two lasers may be used in accordance with some of the embodiments disclosed herein.

In some embodiments, the various three-port, four-port, and m-port devices may form a group of devices S2 that includes optical splitters, optical couplers, optical switches, combinations thereof, and other devices suitable for routing, splitting, combining, or otherwise changing optical signals. In some embodiments, the device may include a modulating section or a group of modulating devices as shown with group or section M. The various groups of components shown and described relative to FIG. 1 (S1, S2, M, S3A, and S4) and FIG. 2 (S1, S2, M, S3B, and S4) may also be referenced as stages corresponding to the various operations performed using the relevant components such as an input stage, a first input splitting stage, a second input splitting stage, a modulating stage, a first output multiplexing stage, multiplexing stages, and an output stage.

In some embodiments, a given use case may selectively use some or all of the group or set of optical inputs shown in section S1 of the device 5 at different times for different applications, such as DR4 or FR4. In various embodiments, the dual or multi-function devices disclosed herein are implemented in a PIC, a substrate, or other semiconductor-based device. In some embodiments, the photonic circuit provides optical inputs for a DR4 operating mode using one, two, or four CW lasers. In other embodiments, the photonic circuit provides inputs for an FR4 operating mode using four CW lasers, wherein each laser has a different wavelength, and wherein a difference between the wavelengths is standardized. The various horizontal and angled lines connecting the various multi-port optical or electro-optical devices are optical paths such as waveguides that may be integrated within the PIC. In some embodiments, one or more optical paths may be defined or implemented using optical fiber segments. These waveguides may be buried or ridge type waveguides and operate by confining propagating optical signals via refractive index contrast with a surrounding media, a technology known to the art. The orientation, length, and number of waveguides are design dependent and are shown as one possible arrangement.

In one embodiment, optical inputs 11, 13, and 15 are dedicated to a DR4 implementation or device operating mode. In particular, optical input 13 is provided for a single CW laser DR4 wavelength, for example 1310 nm. Additionally, a two-laser DR4 specification may be implemented using optical input 11 for a first laser and optical input 15 for a second laser.

In one embodiment, some optical inputs 10, 12, 14, and 16 are used for a DR4 implementation with four CW lasers, each laser feeding one of the four modulators. In general, in various embodiments, the various optical input, optical outputs, and other components of the devices in FIGS. 1 and 2 may be identified as first, second, third, fourth, etc. components without limitation to facilitate identify and enumerate such different components of the devices.

In one embodiment, some optical inputs 10, 12, 14, and 16 are used for an FR4 operating mode. For example, in one embodiment, these inputs carry four optical channels centered at 1271, 1291, 1311, and 1331 nm, respectively. In various embodiments, the order of these laser wavelengths may be arranged differently depending on a design of the multiplexing stages of S3A, S3B For example, a set of four optical inputs 10, 12, 14, 16 may correspond to laser wavelengths of 1271, 1311, 1291, and 1331 nm in some embodiments. Various other wavelengths and lasers may be used with the electro-optical multi-use devices disclosed herein. The electro-optical multi-use device may also include various sensors and electrical contacts to operate the modulators and multiplexers and any other electrically operable components of a given multi-use device.

In some embodiment, section S2 connects the seven (7) optical inputs 10, 11, 12, 13, 14, 15 and 16 in S1 to eight (8) input waveguides 291-298 of the modulator group M. In many embodiments, these connections may be implemented using a network of optical couplers. For example, in most embodiments, a first laser/optical input 10 is in optical communication with a modulator input 291; a second laser input port/optical input 11 is connected to a first input of a splitter 21, the outputs of which are connected to a modulator input 292 and another modulator input 293; a third laser input port/optical input 12 is in is in optical communication with a modulator input 294; a fourth laser input port/optical input 13 is connected to a first input port of splitter 23, the outputs of which are connected to a second input of a splitter 21 and a first input of another splitter 25, the output of which are connected to electro-optical modulator inputs 292, 293, 296, 297; a fifth laser input port/optical input 14 is in optical communication with a modulator input 295; a sixth laser input port/optical input 15 is connected to a second input port of splitter 25, the outputs of which are connected to modulator inputs 296, 297; and a seventh laser input port/ optical input 16 is in optical communication with a modulator input 298. In various embodiments, one or more or all optical inputs to devices 5, 7 may be a laser input port. In some embodiments, modulator input 292 may be in optical communication with waveguide 210.

In various embodiments, the electro-optical device may include various optical circuits defined by optical couplers or splitters or pairs of the same such a first pair of optical couplers and a second pair of optical couplers. In some embodiments, a first pair of optical couplers may be used such that each optical coupler of the first pair of optical couplers is in optical communication with a first optical circuit. In various embodiments, a second pair of optical couplers may be used such that each optical coupler of the second pair of optical couplers in optical communication with one of the optical couplers of the first pair of optical couplers. Further, in some embodiments, one optical coupler of the second pair of optical couplers is in optical communication with one of the four or more modulators.

In some embodiments, the electro-optical device may include a first input coupling stage that includes a first pair of input splitters, and a second input coupling stage that includes a second pair of input splitters and a third pair of input splitters, wherein a first optical coupler or first optical circuit is in optical communication with the first, second, and third pair of input splitters. In some embodiments, the various splitters disclosed herein may be optical couplers. In various embodiments, the electro-optical device may include a first output coupling stage that includes a first output splitter; a second output splitter; a third output splitter; and a fourth output splitter, wherein each output splitter of the first output coupling stage is in optical communication with a modulator.

Referring still to FIG. 1, various 21, 23, 25 optical couplers in section S2 may be used and these couplers may also be splitters in various embodiments. In most embodiments, an optical coupler splits an optical signal from a first input across two outputs and splits an optical signal from a second input across the same two outputs. In many embodiments, optical couplers may split an input signal across the two outputs in a ratio of approximately 1:1, or other ratios. Optical couplers may be passive splitters such as directional couplers, multimode interferometer splitters, or Mach-Zehnder interferometer splitters. In other embodiments, an optical coupler may be an active splitter, such as a Mach-Zehnder interferometer with an active phase adjustment to adjust a splitting ratio. A user may choose an operating mode of the selectable device 5 based on a choice of input port in section S1 and connections of the input ports to optical outputs of sections S4 In some embodiments, the various sections S1, S2, M, S3A, and S4 may also be referred to as groups. In various embodiments, a given device 5, 7 may include various components that are configured for connecting various groups of sections of components. In various embodiments, the components may be a two-port device, a three-port device, or four-port device. A given optical coupler may be a splitter and vice versa for various device embodiments.

In FIG. 1, a modulator section M is shown with an example of four parallel Mach-Zehnder interferometer (MZI) modulators, each modulator comprising 2 input waveguides and two output waveguides, each modulator having a 2×2 optical coupler at an input side and a 2×2 optical coupler at an output side. In some embodiments, a standalone MZI modulator requires only one optical input and one optical output. A given modulator section M may include splitters 24, 26. 29, and 30. In one embodiment, a standalone MZI modulator with one optical input and one optical output may use a 1×2 optical coupler or a 2×1 optical coupler at an optical input and at an optical output. In other embodiments, a modulator may have two optical inputs and two optical outputs and use 2×2 optical couplers or splitters. In most embodiments, in a modulator with two optical inputs and two optical outputs, either of the two inputs may receive light from a CW laser. In many embodiments, such a modulator may then route a modulated signal to either of the two outputs. In most embodiments, in a modulator having two inputs and two outputs, only one input has a desired laser signal and, due to a nature of an MZI, both outputs will have a modulated signal but only one modulated signal will be coupled to fibers. In most embodiments, complimentary input ports and optical outputs of an MZI enable a dual-use or a multi-use nature a PIC. In other embodiments, a modulator having only one optical input or one optical output, such as an MZI with 1×2 couplers or splitters or such as an electro-absorption modulator, may require additional circuits, such as optical switches, before and/or after the modulator.

In many embodiments, such as the exemplary embodiment of FIG. 1, each MZI modulator comprises two waveguide arms and two phase shift sections for electro-optical modulation. In addition, in many embodiments, a low-speed phase shift section is present on one waveguide arm. For example, in FIG. 1, a first MZI modulator comprises two high-speed phase shifters 40, 42 and a low-speed phase shifter 41. In some embodiments, a low-speed phase shifter sets an appropriate operating point of an MZI optical transfer function. For example, for intensity modulation, a low-speed phase shifter may set an MZI at its quadrature point. In some embodiments, a low-speed phase shifter may be implemented with an electro-optical effect, a thermo-optical effect, or another effect. In one embodiment, high-speed phase modulation frequencies are greater than about 10 GHz and low speed modulation frequencies are less than about 100 MHz. However, this boundary between slow and fast speed modulation is merely representative of some embodiments. In many embodiments, the electro-optical device includes a photonic integrated circuit (PIC) that includes a substrate, a first group of optical components, a second group of optical components, a first optical output, a modulator stage, and an output multiplexer, wherein the modulator stage and the output multiplexer are disposed in or on the substrate. In some embodiments, one or more modulators may include a phase shifter with bandwidth above 10 GHz.

In one embodiment, high-speed phase shifter 40 and high-speed phase shifter 42 are a grouping of components that is duplicated on the PIC. In some embodiments, the low-speed phase shifter 41 is replicated as shown, but in other embodiments, the low-speed phase shifter 41 is optional and not included in the device 5 or included in a different configuration. A grouping of phase shifters 41, 40, and 42, which may be high or low phase shifters in various embodiments, is instantiated or replicated four times as shown in the modulation stage or group M in middle portion of FIG. 1. Although numerous components are shown in FIG. 1, additional and disparate components may be integrated into the PIC. In addition, FIG. 1 shows a single stage of components, for example between couplers 20 and 27 there is a single modulating stage. Additional, components could be added in series or parallel with the components shown wherein the additional components could perform additional signal conditioning.

In many embodiments, such as the exemplary embodiment of FIG. 1, each MZI modulator has two output waveguides after a 2×2 splitter. For example, in FIG. 1, a first modulator has a coupler 27 at an output side. In some embodiments, each output waveguide has an optical tap coupler to extract a small percentage of a modulated optical signal and feed it to a photodetector. For example, in FIG. 1, a first modulator with a coupler 27 has two photodetectors 60, 61 at output waveguides. Other photodetectors 62, 63, 64, 65, and 66 may also be used as power monitors in some embodiments. In some embodiments, a power tap or optical tap coupler and a photodetector may be used to monitor and control settings of a laser and/or an operating point of a modulator. In some embodiments, by controlling a low-speed phase shifter to balance signal amplitudes of photodetectors, an MZI may be kept at or near its quadrature point. Furthermore, in some embodiments, a targeted output power of a transmitter may be maintained by setting a laser operating condition to maintain a targeted amplitude of various photodetectors. In embodiments wherein various devices in the section S2 are actively controlled, photodetector signals may be used to regulate the various actively controlled devices in S2. In other embodiments, no power tap or photodetector may be present.

In FIG. 1, the section S4 includes optical outputs 80, 81, 82, 83, 84. Some output ports/optical outputs 80, 81, 83, 84 are in optical communication with one of the eight modulator outputs of the four modulators through the section S3A, and are thus dedicated as outputs for a DR4 operating mode. One optical output 82 is connected to one output of each of the four modulators through the section S3A, and is thus dedicated as an output for an FR4 operating mode. In some embodiments, the electro-optical device includes a group of optical outputs such as optical outputs 80, 81, 82, 83, 84, the group of outputs may include a second optical output of the second operating mode; a third optical output of the second operating mode; a fourth optical output of the second operating mode; and a fifth optical output of the second operating mode. In some embodiments, the second optical output, the third optical output, the fourth optical output, and the fifth optical output are operable to output a first different signal on each output in response to one laser being connected to one of the three or more optical inputs. In various embodiments, the second optical output, the third optical output, the fourth optical output, and the fifth optical output are operable to output a second different signal on each output in response to two lasers being connected to two of the three or more optical inputs.

In FIG. 1, in section S3A, a first output of each modulator is in optical communication with a dedicated output for that modulator while a second output of each modulator is in optical communication with a shared output through a multiplexing circuit, multiplexing four modulated signals of different wavelengths to a single output. For example, for a DR4 operating mode, a first output 191 of a first modulator is in optical communication with an optical output 80; a second modulator output 194 of a second modulator is in optical communication with an optical output 81; a first modulator output 195 of a third modulator is in optical communication with an optical output 83; and a second modulator output 198 of a fourth modulator is in optical communication with an optical output 84. In various embodiments, for an FR4 operating mode, remaining modulator outputs 192, 193, 196, 197 are multiplexed together to a separate optical output port 82. In many embodiments, various multiplexing techniques are possible, such as wavelength interleavers, arrayed waveguide gratings, echelle gratings, cascaded wavelength filters utilizing ring resonators, Bragg filters, or other techniques. FIG. 1 shows one example of 4×1 multiplexing technique using two cascaded stages in section S3A, wherein modulator output 192 and modulator output 193 are multiplexed together through multiplexer 90 with an output waveguide 107; modulator output 196 modulator output 197 of the fourth modulator are multiplexed together through multiplexer 91 with an output 108. In some embodiments, a first multiplexer 90 and a second multiplexer 91 are in optical communication with the output multiplexer 92. In various embodiments, a given modulator may include two optical modulator inputs.

The output waveguides 107 and 108 are then multiplexed together through a multiplexer 92, the output of which is connected to optical output 82. In some embodiments, the first multiplexing stage comprising multiplexers 90, 91 can utilize wavelength multiplexing. In some embodiments, the second multiplexing stage comprising a multiplexer 92 can utilize wavelength multiplexing or polarization multiplexing. In one embodiment, in polarization multiplexing, modulated signals at modulator outputs 192, 193 enter a multiplexer 92 with a first polarization and leave the multiplexer 92 at the first polarization. Also in this embodiment, modulated signals at modulator outputs 196, 197 enter the multiplexer 92 with the first polarization and leave the multiplexer 92 at a second polarization, wherein the first polarization is orthogonal to the second polarization. In such an embodiment, the multiplexer 92 is a polarization beam splitter and rotator. In another embodiment, modulated signals at modulator outputs 192, 193 enter the multiplexer 92 with the first polarization while modulated signals at modulator outputs 196, 197 enter the multiplexer 92 at the second polarization, and wherein the multiplexer 92 is a polarization beam splitter. Such an embodiment may be realized if light from a laser at optical inputs 14, 16 is of polarization orthogonal to light from a laser at optical inputs 10, 12. Such an embodiment may also be realized if polarization rotators exist between optical inputs 14 and 16 and the inputs of the multiplexer 92, or between optical inputs 10, 12 and the inputs of the multiplexer 92. A person of ordinary skill in the art of polarization multiplexing will recognize that many different implementations are possible.

Figure 2:
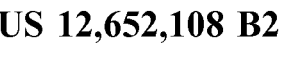
FIG. 2 is a schematic illustration of a dual-use/multi-use electro optical device with selectable optical inputs and optical outputs providing both DR4 capability and a single stage multiplexing arrangement for FR4 according to an exemplary embodiment of the disclosure.

Refer now to FIG. 2, containing a section S3B, wherein a 4:1 multiplexer is shown as a multiplexer 93. A person of ordinary skill in the art will recognize that many multiplexing implementations that combine signals of various wavelengths are possible. For example, FIG. 1 depicts one such implementation of a 4:1 multiplexer corresponding to the general multiplexer 93 of FIG. 2.

In some embodiments, optical output 82 is used for FR4 operating mode in which 2 or more input signals having wavelengths (lambda 1, lambda 2, lambda 3, lambda 4, etc.) may be combined or multiplexed to generate an output optical signal at output FR4. As discussed herein with the inputs of group or section S1, the square symbol at an input and at an output corresponds to possible optical path endpoints for signals being handled using the device 5 in DR4 operating mode. The various circles at the inputs and the one circle shown at optical output 83 corresponding to signals being handled using the device 5 in FR4 operating mode. In various embodiments, a given optical output may also be referred to as an optical output port. Similarly, in various embodiments, a given optical input may also be referred to as an optical input port.

In one embodiment, the PIC is used to implement a DR4 operating mode with two lasers. For example, a laser for DR4 is input selectively at optical input 11. A waveguide 201 guides an optical signal from the laser to an optical coupler 21, and at least a portion of an input to the coupler 21 is directed into a waveguide 203. In turn, an optical signal confined in the waveguide 203 is routed to an MZI modulator comprising a coupler 22, a low-speed phase shifter 44 and two high-speed phase shifters 43, 45, and a second coupler 28. Waveguide 204 may be in optical communication with low-speed phase shifter 44. Waveguide 208 may be in optical communication with low-speed phase shifter 45. In addition, phase shifters 46, 48, and 49 may also be used in a given modulator stage. Finally, at least a portion of an output signal from the coupler 28 is carried by a waveguide 209 to an optical output 81. An output signal may also be carried by waveguide 211. A given waveguide as shown and described with regard to devices 5, 7 may include one waveguide segment or include multiple waveguide segments.

In one embodiment, when an optical device as disclosed herein implements a DR4 operating mode with a single laser, an optical signal is selectively input at an optical input 13. The optical signal then may be divided into two substantially equal portions by an optical coupler 23, each portion of which is then divided again by additional optical couplers 21, 25, whence finally optical signals arrive at four modulators. The modulated signals are interrogated by power monitors 60, 63, 64, 67 and guided to optical outputs 80, 81, 83, 84. These optical outputs may be dedicated DR4 optical outputs. In some embodiments, the device may include one or more power monitor. A power monitor may be in electrical communication with a waveguide in optical communication with a modulator of the modulator stage, the power monitor operable to generate a signal such as a control signal. In some embodiments, the control signal is operable to control one or more of the modulators.

The dual-use or multi-use electro-optical device can be used to implement FR4. Various waveguides may be used to direct an optical signal from a source, such as a laser, such that it travels along various optical paths and modified by various active or passive elements along such paths. By way of example, laser wavelengths for FR4, are selectively input at optical inputs 10, 12, 14, and 16. Input signals travel separate but functionally similar paths. Considering input 10, the input optical signal is guided along waveguide 100 to the first modulator, comprising a first optical coupler 20, low-speed phase shifter 41, high-speed phase shifters 40, 42, and a second optical coupler 27. A low-speed phase shifter 50 may also be used with a phase-shifter 51. At least a portion of the optical signal travels along waveguide 106 into multiplexer 90. Multiplexer 90 combines signals from optical inputs 10 and 12. In some embodiments, input waveguide 102 and output waveguide 105 may be used in device as shown to direct optical signals.

In some embodiments, selecting optical inputs 10 and 12 is suitable for FR4 operation with optical input 10 receiving a first wavelength, lambda 1 and optical input 12 receiving a third wavelength lambda 3. A multiplexer in devices 5 and 7 may be a passive or active device that combines the input photonic signals to a single output. The combined signal is guided along a waveguide 107 to a multiplexer 92 which combines multiplexed signals from multiplexer 90 and multiplexer 91. The resulting multiplexed signal is guided by waveguide 110 to FR4 optical output 82. In some embodiments, the output at optical output 82 is a multiplexed signal that includes the signals from optical inputs 10, 12, 14, and 16 and the associated first, second, third, and fourth wavelengths corresponding to lambda 1, lambda 3, lambda 2, and lambda 4 for FR4 operation.

Refer now to the example embodiment of FIG. 2. FIG. 2 is schematic illustration of a dual-use or multi-use electro-optical device 7 for DR4 or FR4 specifications that includes many of the components of FIG. 1, which are labeled accordingly. In some embodiments, multiplexers 90-92 such as 2:1 multiplexers, from FIG. 1 are replaced by a single multiplexer 93, such as a 4:1 multiplexer. In some embodiments, the resulting signal output from 93 is substantially identical to the output from multiplexer 92 in FIG. 1. In various embodiments, multiplexer 92 is an output multiplexer having an optical output 82.

FIG. 1 and FIG. 2 depict exemplary four channel electro-optical devices 5, 7 for DR4 and FR4 operating modes for dual-use or multi-use electro-optical devices that may be integrated on a single PIC, substrate, or other device. In various embodiments, these solutions can be duplicated in parallel (one or more times) to accommodate eight or more channels on a single PIC or doubled again to handle 16 channels, etc., without limitation.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP), PIC, optical components, electronic devices, and combinations thereof. In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Although the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, coatings/layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A multi-use electro-optical device comprising:

a first group of optical inputs comprising one or more optical inputs, wherein the one or more optical inputs are user selectable for a first operating mode, wherein the first operating mode is a direct reach (DR) operating mode;

a second group of optical inputs comprising four or more optical inputs, wherein the four or more optical inputs are user selectable for a second operating mode, wherein the second operating mode is a far reach (FR) operating mode;

a first optical output, wherein the first optical output is operable to support the second operating mode, the first optical output in optical communication with the four or more optical inputs;

a second group of optical outputs comprising four or more optical outputs, wherein the four or more optical outputs are user selectable for the first operating mode; and a modulator stage comprising four or more modulators, each modulator comprising two optical modulator inputs and two optical modulator outputs, wherein a first optical modulator output of each of the four or more modulators is connected to a corresponding one of the four or more optical outputs and a second optical modulator output of each of the four or more modulators is connected to the first optical output via an output multiplexer.

2. The multi-use electro-optical device of claim 1 further comprising:

an optical circuit connecting the first group of optical inputs to a first optical modulator input of each of the four or more modulators, and connecting the second group of optical inputs to a second optical modulator input of each of the four or more modulators.

3. The multi-use electro-optical device of claim 2 further comprising photonic integrated circuit comprising a substrate, the first group, the second group, the first optical output, the modulator stage, and the output multiplexer, wherein the modulator stage and the output multiplexer are disposed in or on the substrate.

4. The multi-use electro-optical device of claim 3, wherein the first operating mode is DR4 using a first laser.

5. The multi-use electro-optical device of claim 3, wherein the first operating mode is DR4 using a first laser and a second laser.

6. The multi-use electro-optical device of claim 5, wherein the second operating mode is FR4, wherein each optical input of the four or more optical inputs is operable to receive an input wavelength selected from the group consisting of a first wavelength, a second wavelength, a third wavelength, and a fourth wavelength.

7. The multi-use electro-optical device of claim 2 further comprising:

a first input coupling stage comprising a first pair of input splitters, and a second input coupling stage comprising a second pair of input splitters and a third pair of input splitters, wherein the optical circuit is in optical communication with the first, second, and third pair of input splitters.

8. The multi-use electro-optical device of claim 2 further comprising:

a first output coupling stage comprising a first output splitter; a second output splitter; a third output splitter; and a fourth output splitter, wherein each output splitter of the first output coupling stage is in optical communication with a modulator of the modulator stage.

9. The multi-use electro-optical device of claim 2 further comprising:

a first multiplexer; and a second multiplexer, the first multiplexer and the second multiplexer in optical communication with the output multiplexer.

10. The multi-use electro-optical device of claim 2 further comprising:

a first pair of optical couplers, each optical coupler of the first pair of optical couplers in optical communication with the optical circuit.

11. The multi-use electro-optical device of claim 10 further comprising:

a second pair of optical couplers, each optical coupler of the second pair of optical couplers in optical communication with one of the optical couplers of the first pair of optical couplers.

12. The multi-use electro-optical device of claim 11 further comprising:

a second pair of optical couplers, an optical coupler of the second pair of optical couplers in optical communication with one of the optical couplers of the first pair of optical couplers.

13. The multi-use electro-optical device of claim 11, wherein one optical coupler of the second pair of optical couplers is in optical communication with one of the four or more modulators.

14. The multi-use electro-optical device of claim 2 further comprising a power monitor, the power monitor in electrical communication with a waveguide in optical communication with a modulator of the modulator stage, the power monitor operable to generate a signal, the signal operable to control the modulator.

15. The multi-use electro-optical device of claim 2, wherein each modulator comprises a phase shifter with bandwidth above 10 GHz.

16. The multi-use electro-optical device of claim 2 further comprising a group of optical outputs, the group of outputs comprising a second optical output of the second operating mode; a third optical output of the second operating mode; a fourth optical output of the second operating mode; and a fifth optical output of the second operating mode.

17. The multi-use electro-optical device of claim 16, wherein the second optical output, the third optical output, the fourth optical output, and the fifth optical output are operable to output a first different signal on each output in response to one laser being connected to one of the four or more optical inputs.

18. The multi-use electro-optical device of claim 17, wherein the second optical output, the third optical output, the fourth optical output, and the fifth optical output are operable to output a second different signal on each output in response to two lasers being connected to two of the four or more optical inputs.

19. The multi-use electro-optical device of claim 2, wherein the optical circuit comprises three-port device, and wherein the output multiplexer is a three-port device or a four-port device.

20. A multi-use electro-optical device comprising:

a first group of optical inputs comprising one or more optical inputs, wherein the one or more optical inputs are user selectable for a first operating mode;

a second group of optical inputs comprising four or more optical inputs, wherein the four or more optical inputs are user selectable for a second operating mode;

a first optical output, wherein the first optical output operable to support the second operating mode, the first optical output in optical communication with the four or more optical inputs;

a second group of optical outputs comprising four or more optical outputs, wherein the four or more optical outputs are user selectable for a first operating mode;

a modulator stage comprising four or more modulators, each modulator comprising two optical modulator inputs and two optical modulator outputs such that the modulator stage has two sets of optical modulator inputs and two sets of optical modulator outputs;

a first optical circuit connecting the first group of optical inputs to a first set of optical inputs of four or more modulators of the two sets of optical modulator inputs, and connecting the second group of optical inputs to a second set of optical inputs of the four or more modulators of the two sets of optical modulator inputs;

a second optical circuit connecting a first set of optical outputs of the four or more modulators of the two sets of optical modulator outputs to the second group of optical outputs, for the first operating mode; and an output multiplexer connecting a second set of optical outputs of the four or more modulators of the two sets of optical modulator outputs to the first optical output, for the second operating mode.

\* \* \* \* \*